(12) United States Patent
Georgieva et al.

(10) Patent No.: US 9,102,014 B2
(45) Date of Patent: Aug. 11, 2015

(54) METHOD OF SERVICING AN AIRFOIL ASSEMBLY FOR USE IN A GAS TURBINE ENGINE

(75) Inventors: Petya M. Georgieva, Oviedo, FL (US); Harshawardhan S. Bhide, Orlando, FL (US); Thomas N. Silvey, Chuluota, FL (US); Mrinal Munshi, Orlando, FL (US); Steven J. Vance, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 577 days.

(21) Appl. No.: 12/817,400

(22) Filed: Jun. 17, 2010

(65) Prior Publication Data

US 2011/0308085 A1      Dec. 22, 2011

(51) Int. Cl.
*B23P 6/00*   (2006.01)
*F01D 5/14*   (2006.01)
*F01D 5/00*   (2006.01)

(52) U.S. Cl.
CPC .............. *B23P 6/002* (2013.01); *F01D 5/005* (2013.01); *F05D 2230/10* (2013.01); *F05D 2230/80* (2013.01); *Y10T 29/49318* (2015.01)

(58) Field of Classification Search
USPC ............... 29/889.1, 402.06, 402.05, 402.11
See application file for complete search history.

(56) References Cited

U.S. PATENT DOCUMENTS

| | | |
|---|---|---|
| 5,167,721 A | 12/1992 | McComas et al. |
| 5,281,062 A | 1/1994 | Dunkman et al. |
| 5,558,922 A | 9/1996 | Gupta et al. |
| RE35,611 E | 9/1997 | McComas et al. |
| 6,099,655 A | 8/2000 | Farr et al. |
| 6,210,488 B1 | 4/2001 | Bruce |
| 6,490,791 B1 * | 12/2002 | Surace et al. ................ 29/889.1 |
| 6,544,346 B1 | 4/2003 | Grossklaus, Jr. et al. |
| 6,660,102 B2 | 12/2003 | Jeutter et al. |
| 6,800,829 B1 | 10/2004 | Nimmons |
| 6,905,396 B1 | 6/2005 | Miller et al. |
| 6,955,308 B2 | 10/2005 | Segrest et al. |
| 7,063,509 B2 * | 6/2006 | Snook et al. ................. 416/189 |
| 7,335,089 B1 | 2/2008 | Thompson |
| 7,896,726 B1 * | 3/2011 | Miller et al. ...................... 451/2 |
| 7,934,975 B2 * | 5/2011 | Thompson ........................ 451/5 |
| 2007/0202269 A1 | 8/2007 | Potter et al. |
| 2007/0269316 A1 | 11/2007 | Williams et al. |
| 2008/0047138 A1 | 2/2008 | Milleville |

FOREIGN PATENT DOCUMENTS

| | | |
|---|---|---|
| EP | 1270141 A2 | 1/2003 |
| EP | 1688587 A2 | 8/2006 |
| JP | 2003056359 A | 2/2003 |
| JP | 2008168420 A | 7/2008 |
| KR | 1020030001239 | 1/2013 |
| WO | 2009121767 A1 | 10/2009 |

* cited by examiner

*Primary Examiner* — Alexander P Taousakis (57) ABSTRACT

A method of servicing an airfoil for use in a gas turbine engine. The airfoil assembly is defined by a base material and includes an airfoil and a platform from which the airfoil extends. A predetermined amount of the base material is removed from the airfoil assembly proximate to a fillet area of the airfoil assembly via water jet material removal. The fillet area comprises a junction between the airfoil and the platform and is located at an intersection between the airfoil and the platform. A remainder of the base material comprising base material of the airfoil assembly other than proximate to the fillet area is left intact.

19 Claims, 7 Drawing Sheets

METHOD OF SERVICING AN AIRFOIL ASSEMBLY FOR USE IN A GAS TURBINE ENGINE

FIELD OF THE INVENTION

The present invention relates to servicing an airfoil assembly for use in a gas turbine engine.

BACKGROUND OF THE INVENTION

In a turbomachine, such as a gas turbine engine, air is pressurized in a compressor section then mixed with fuel and burned in a combustion section to generate hot combustion gases. The hot combustion gases are expanded within a turbine section of the engine where energy is extracted from the combustion gases to power the compressor section and to produce useful work, such as turning a generator to produce electricity.

The hot combustion gases created in the combustion section travel through a series of turbine stages within the turbine section. A turbine stage may include a row of stationary airfoil assemblies, i.e., vanes, followed by a row of rotating airfoil assemblies, i.e., turbine blades, where the turbine blades extract energy from the hot combustion gases for powering the compressor section and providing output power.

One type of airfoil assembly, i.e., a turbine blade, comprises an airfoil extending from a radially inner platform at a root end to a radially outer portion of the airfoil, and includes opposite pressure and suction sidewalls meeting at leading and trailing edges of the airfoil. After periods of use, it has been found that areas adjacent to locations where the airfoil intersects with the platform become damaged, i.e., cracked, due to overheating and oxidation, such that repair/replacement procedures are required.

SUMMARY OF THE INVENTION

In accordance with a first aspect of the present invention, a method is provided of servicing an airfoil for use in a gas turbine engine. The airfoil assembly is defined by a base material and comprises an airfoil and a platform from which the airfoil extends. A predetermined amount of the base material is removed from the airfoil assembly proximate to a fillet area of the airfoil assembly via water jet material removal. The fillet area comprises a junction between the airfoil and the platform and is located at an intersection between the airfoil and the platform. A remainder of the base material comprising base material of the airfoil assembly other than proximate to the fillet area is left intact. A radius of curvature at the fillet area of the resulting structure after removing the predetermined amount of the base material is at least as large as a radius of curvature at the fillet area before removing the predetermined amount of the base material.

Prior to the removal of the predetermined amount of the base material, at least one coating may be stripped from the airfoil assembly.

Removing the predetermined amount of the base material may comprise removing a first portion of the base material from the airfoil and removing a second portion of the material from the platform.

Removing the first portion of the base material from the airfoil may comprise removing base material starting from a location about 1 inch radially outwardly from the intersection between the airfoil and the platform.

Removing the second portion of the base material from the platform may comprise removing base material to a location about 1 inch removed from the intersection between the airfoil and the platform along a length of the platform.

Removing the predetermined amount of the base material may comprise removing an amount of material corresponding to a depth of the base material at the fillet area measured from an outer surface of the base material of from about 0.030 inch to about 0.080 inch.

Removing the predetermined amount of the base material may comprise removing an amount of material corresponding to a depth of the base material at the fillet area measured from an outer surface of the base material of about 0.060 inch.

Removing the predetermined amount of the base material may comprise varying the amount of the base material that is removed from a leading edge of the airfoil to a trailing edge of the airfoil.

The amount of the base material that is removed proximate to the leading and trailing edges of the airfoil may be less than an amount of the base material that is removed at a location generally midway between the leading and trailing edges of the airfoil.

The amount of the base material that is removed proximate to the leading edge of the airfoil may be more than the amount of the base material that is removed at the trailing edge of the airfoil.

The radius of curvature at the fillet area of the resulting structure after removing the predetermined amount of the base material may be substantially the same as the radius of curvature at the fillet area before removing the predetermined amount of the base material.

In accordance with a second aspect of the present invention, a method is provided of servicing an airfoil for use in a gas turbine engine. The airfoil assembly is defined by a base material and comprises an airfoil and a platform from which the airfoil extends. A predetermined amount of the base material is removed from the airfoil assembly proximate to a fillet area of the airfoil assembly via water jet material removal. The fillet area comprises a junction between the airfoil and the platform and is located at an intersection between the airfoil and the platform. A remainder of the base material comprising base material of the airfoil assembly other than proximate to the fillet area is left intact. Removing the predetermined amount of the base material may comprise varying the amount of the base material that is removed from a leading edge of the airfoil to a trailing edge of the airfoil.

The radius of curvature at the fillet area of the resulting structure after removing the predetermined amount of the base material may be at least about 0.26 inch.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
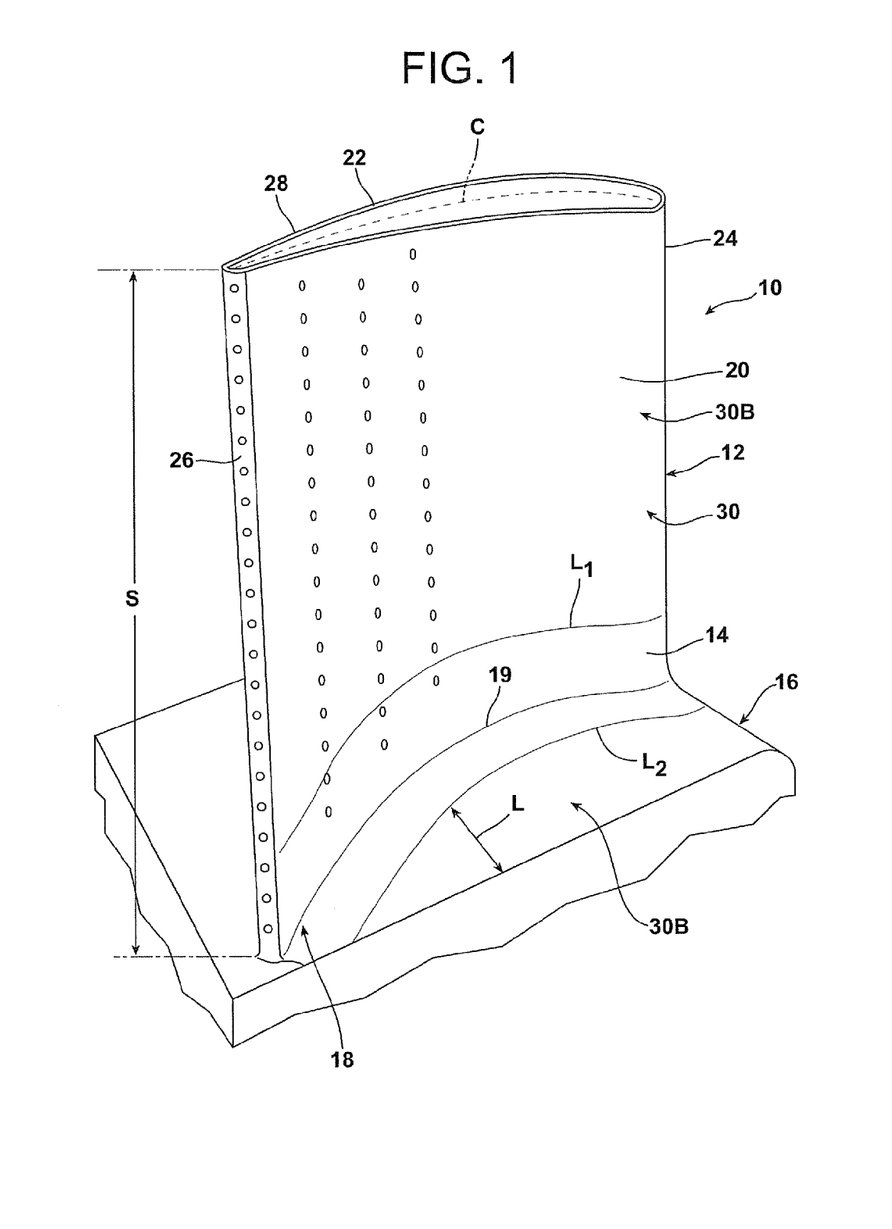
FIG. 1 is a perspective view of an airfoil assembly to be serviced according to an embodiment of the invention.

Shown in FIG. 1 is an airfoil assembly 10 adapted for use in a gas turbine engine (not shown). When assembled in a gas turbine engine, the airfoil assembly 10 forms one of a row of rotating airfoil assemblies, which row of rotating airfoil assemblies extends circumferentially about a turbine rotor (not shown) of the engine. A plurality of axially spaced apart rows of rotating airfoil assemblies are typically provided. Hot combustion gases created in a conventional combustor assembly (not shown) are discharged into a turbine section (not shown) of the engine in which the rows of airfoil assemblies are employed. Rows of stationary airfoil assemblies (not shown) comprising stationary vanes direct the hot combustion gases toward corresponding rows of the rotating airfoil assemblies, which rotate and cause corresponding rotation of the turbine rotor.

The airfoil assembly 10 shown in FIG. 1 comprises a turbine blade comprising an exemplary airfoil 12. The airfoil 12 extends radially outwardly from and in the embodiment shown is integrally joined at a root end 14 thereof to a platform 16 of the airfoil assembly 10. The airfoil 12 is joined to the platform 16 at a fillet area 18 of the airfoil assembly 10. The fillet area 18 comprises a junction between the airfoil 12 and the platform 16 and is located at an intersection 19 between the airfoil 12 and the platform 16. The airfoil assembly 10 may further comprise a shank 17, see FIG. 2, which is integrally connected to the platform 16. The shank 17 is coupled to a root (not shown), which root is adapted to be coupled to a corresponding rotor disc (not shown) forming part of the rotor. Rows of airfoil assemblies 10 are coupled to the discs so as to cause rotation of the rotor during operation of the engine.

Figure 2:
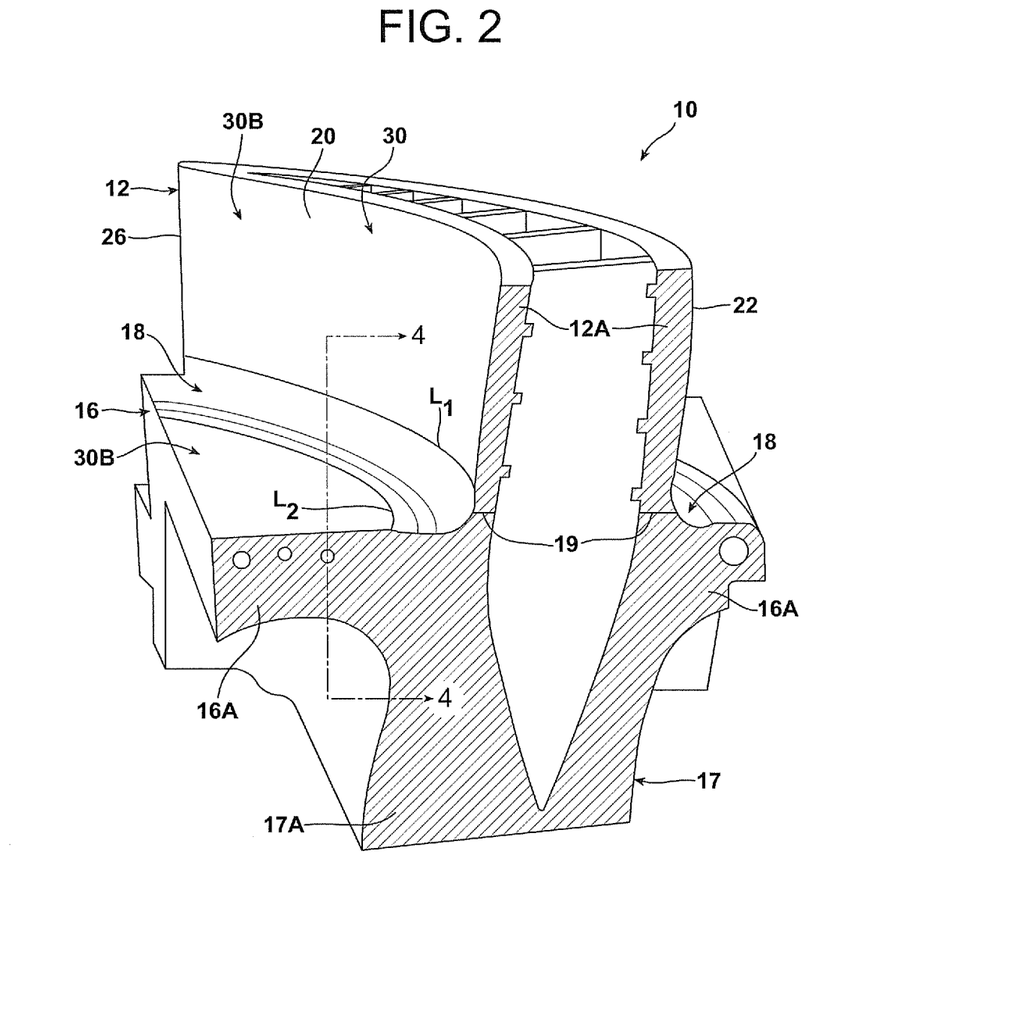
FIG. 2 is an enlarged perspective view, partially in section, illustrating a portion of the airfoil assembly shown in FIG. 1.

As shown in FIGS. 1 and 2, the airfoil 12 includes a generally concave pressure sidewall 20 and an opposed, generally convex suction sidewall 22. The pressure and suction sidewalls 20 and 22 of the airfoil 12 converge at a first location defined at a leading edge 24 of the airfoil 12 and at a second location defined at a trailing edge 26 of the airfoil 12 opposed from the leading edge 24. The pressure and suction sidewalls 20 and 22 extend in a chordal direction C, i.e., in a generally axial direction of the engine, between the opposite leading and trailing edges 24 and 26 of the airfoil 12, see FIG. 1. The leading and trailing edges 24 and 26 extend radially and span a distance S from the root end 14 of the airfoil 12 to a tip end 28 of the airfoil 12 opposed from the root end 14, see FIG. 1.

The airfoil assembly 10 is defined by a base material 30, which base material 30 forms structural walls 12A, 16A, and 17A of the airfoil 12, the platform 16, and the shank see FIG. 2. The base material 30 may comprise the same material for each of the airfoil, platform, and shank structural walls 12A, 16A, 17A. The base material 30 preferably comprises a high heat tolerant material capable of withstanding the high temperature environment of the turbine section of the engine. For example, the base material 30 may comprise a stainless steel based alloy or a nickel or cobalt based super alloy.

It is noted that one or more layers or coatings (not shown) may be applied over the base material 30. For example, a thermal barrier coating (TBC) and a bond coat may be applied over the base material 30, so as to provide a high heat tolerant coating over the base material 30. As will be described in detail herein, these layers or coatings are preferably stripped off of the base material 30 prior to a method of servicing an airfoil assembly to be described herein.

During operation of the engine, cracks and/or other surface defects may form in the base material 30, i.e., caused by overheating and oxidation of the base material 30, as discussed above. One area that has been found to be prone to cracks and/or other surface defects is the fillet area 18 of the airfoil assembly 10. The method of servicing an airfoil assembly 10 to be described herein can be utilized to remove these cracks/surface defects while maintaining the structural rigidity of the airfoil assembly 10.

Figure 3:
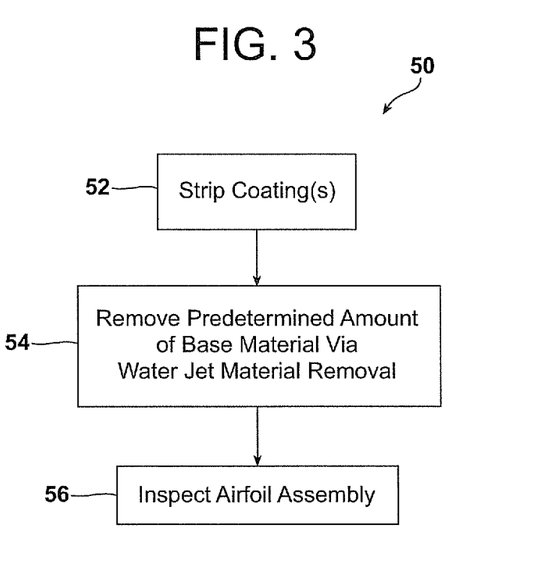
FIG. 3 is a flow chart illustrating steps for servicing an airfoil assembly according to an embodiment of the invention.

Referring now to FIG. 3, a method 50 of servicing an airfoil assembly, such as the airfoil assembly 10 described herein with reference to FIGS. 1 and 2, is illustrated. In accordance with one aspect of the invention, the airfoil assembly 10 to be serviced may include one or more cracks/surface defects formed therein proximate to the fillet area 18 on the pressure sidewall 20 and/or the suction sidewall 22.

At step 52, one or more coatings, such as TBC coatings, bond coatings, etc., may be stripped from the airfoil assembly 10. The TBC and bond coatings may be removed, for example, via a chemical stripping process, e.g., by dipping the airfoil assembly 10 in an acid bath, which chemical stripping process preferably does not adversely affect the base material 30.

At step 54, a predetermined amount of the base material 30 of the airfoil assembly 10 is removed via water jet material removal, such as by using a conventional water jet milling machine. According to one aspect of the invention, only a portion 30A of the base material 30 (see FIG. 4) proximate to the fillet area 18 of the airfoil assembly 10 is removed, and a remainder 30B of the base material 30 (see FIGS. 1, 2, and 4) comprising base material 30 other than that which is proximate to the fillet area 18 is left intact. Since the remainder 30B of the base material 30 is left intact, the structural rigidity of the airfoil assembly 10 is not compromised. That is, if base material 30 corresponding to the entire airfoil assembly 10 were to be removed, the airfoil assembly 10 may become too weak for operation in the engine.

Figure 4:
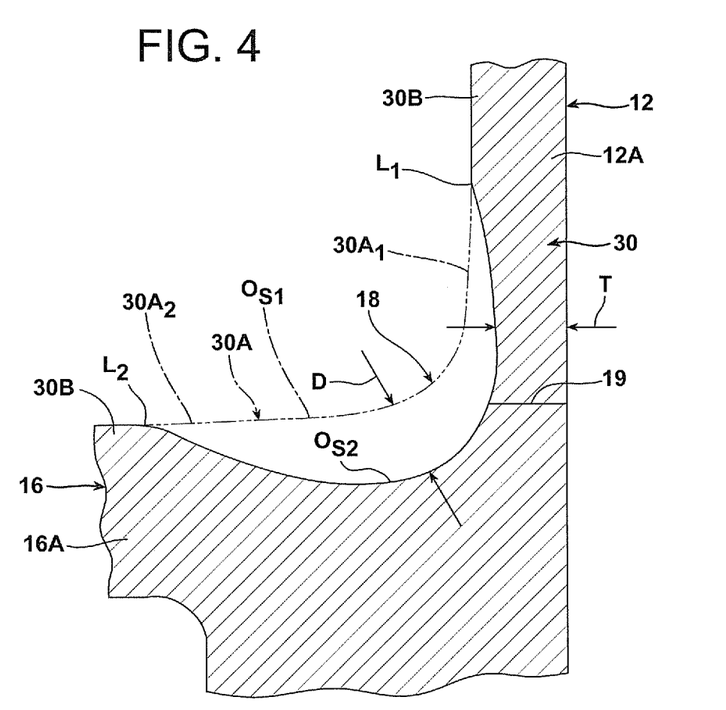
FIG. 4 is a cross sectional view taken along lines 4-4 in FIG. 2.

According to one aspect of the invention, referring to FIG. 4, removing the predetermined amount of the base material 30 at step 54 may comprise removing a first portion $30A_1$ of the base material 30 from the airfoil 12 proximate to the fillet area 18, and removing a second portion $30A_2$ of the base material 30 from the platform 16 proximate to the fillet area 18. As one example, the first portion $30A_1$ of the base material 30 may be removed starting from a location $L_1$ about 1 inch radially outwardly from the intersection 19 between the airfoil 12 and the platform 16. The removal of the first portion $30A_1$ of the base material 30 may commence at the location $L_1$ and may gradually excavate into the base material 30 proximate to the intersection 19 between the airfoil 12 and the platform 16. The amount of the base material 30 that is removed proximate to the intersection 19 may correspond to a depth D (see FIG. 4) of from about 0.030 inch to about 0.080 inch, and preferably the depth D is about 0.060 inch, wherein the depth D is measured from an outer surface $O_{S1}$ of the base material 30 prior to the removal of the base material portion 30A to an outer surface $O_{S2}$ of the base material portion 30A after the removal of the base material portion 30A. The second portion $30A_2$ of the base material 30 may be removed starting from a location $L_2$ about 1 inch removed from the intersection 19 along a lateral length L (see FIG. 1) of the platform 16. The amount of the second portion $30A_2$ of the base material 30 that is removed may gradually lessen from the depth D proximate to the intersection 19 so as to merge with the outer surface $OS_2$ at the location $L_2$.

Figure 4A:
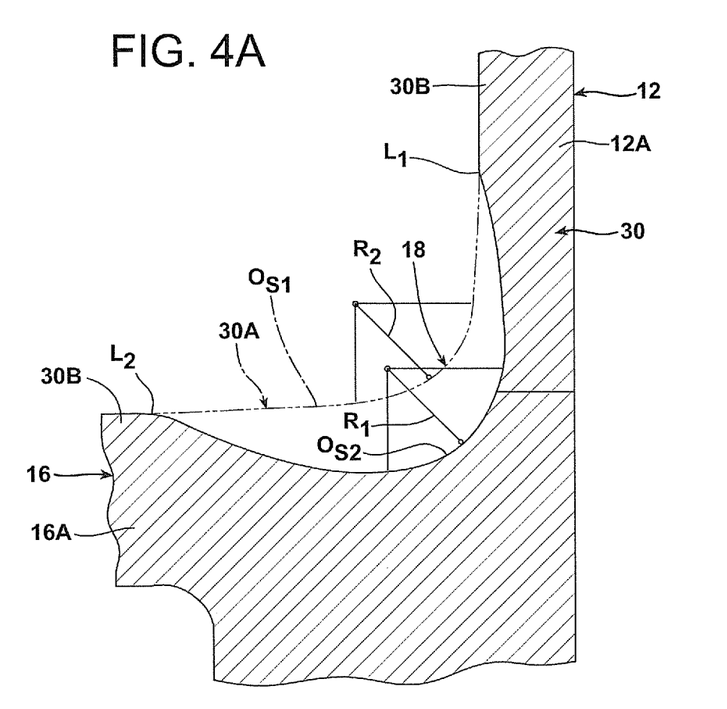
FIG. 4A is a cross sectional view taken along lines 4-4 in FIG. 2 illustrating a radius of curvature at a fillet area of the airfoil assembly before and after the airfoil is serviced according to an embodiment of the invention.

Referring to FIG. 4A, a radius of curvature $R_1$ of the airfoil assembly 10 at the fillet area 18 after the removal of the base material portion 30A is at least as large, and is preferably substantially the same, as a radius of curvature $R_2$ of the airfoil assembly 10 at the fillet area 18 before the removal of the base material portion 30A. According to one aspect of the invention, the radii of curvature $R_1$ and $R_2$ may be about 0.26 inch, but could be larger or smaller depending on the configuration of the airfoil assembly 10 and the engine in which it is to be employed. Since the radius of curvature $R_1$ at the fillet area 18 after the removal of the base material portion 30A is substantially the same as the radius of curvature $R_2$ at the fillet area 18 before the removal of the base material portion 30A, the aerodynamics of the flow of hot combustion gases past the airfoil assembly 10 will not be substantially changed by the removal of the base material portion 30A. This is preferable, as the original configuration and shape of the airfoil assembly 10, i.e., before the removal of the base material portion 30A, are designed so as to effect an efficient flow of the combustion gases through the turbine section of the engine. Hence, the efficient flow of the combustion gases through the turbine section of the engine is not believed to be adversely affected by the removal of the base material portion 30A, since the radius of curvature $R_2$ is substantially the same as the radius of curvature $R_1$.

During the water jet material removal of the predetermined amount of the base material 30 at step 54, cracks and/or other surface defects in the base material 30 proximate to the fillet area 18 are removed. That is, by removing the base material 30 in which the cracks/surface defects are located, the cracks/surface defects themselves are removed. Hence, the stress concentration is believed to be reduced proximate to the fillet area 18, thus increasing a lifespan of the airfoil assembly 10. Further, the reduction in the thickness T of the base material 30 proximate to the fillet area 18 is believed to decrease the thermal gradient of the base material 30 proximate to the fillet area 18. For example, since the thickness T of the base material 30 proximate to the fillet area 18 is reduced, the cooling effect on the airfoil assembly 10 at the fillet area 18 may be improved. Also the removal of the cracks/surface defects from the base material 30 will eliminate their propagation so as to prevent further damage to the airfoil assembly 10. It is noted that the reduction in the thickness T of the base material 30 proximate to the fillet area 18 is not believed to substantially compromise the structural rigidity of the airfoil assembly 10.

Once the base material portion 30A is removed via water jet material removal at step 54, the airfoil assembly 10 may be inspected at step 56 to ensure that all cracks/surface defects in the base material 30 proximate to the fillet area 18 were removed. If so, the airfoil assembly 10 may be allowed to proceed through any necessary further repair procedures and may be put back into service. If not, the airfoil assembly 10 may be quarantined, such as for testing or destruction.

The method 50 described herein is believed to provide an efficient, cost effective way to repair airfoil assemblies 10, such as airfoil assemblies 10 having surface cracks and/or other surface defects proximate to the fillet area 18, without adversely affecting the structural rigidity of the airfoil assembly 10. Further, since water jet material removal can be precisely calibrated and performed, i.e., using a water jet milling machine, the accuracy of the removal of the base material portion 30A is high.

It is noted that the aspects of the invention described herein may be performed during a repair process, i.e., to repair/replace damaged airfoil assemblies 10, such as in situations where the base material 30 at or near the fillet area 18 has become damaged during engine operation due to overheating and oxidation. Alternatively, an airfoil assembly may be provided as a new component in an engine having a fillet area whose dimension match those of the airfoil assembly 10 described herein after the method 50 was performed thereto.

Figure 5:
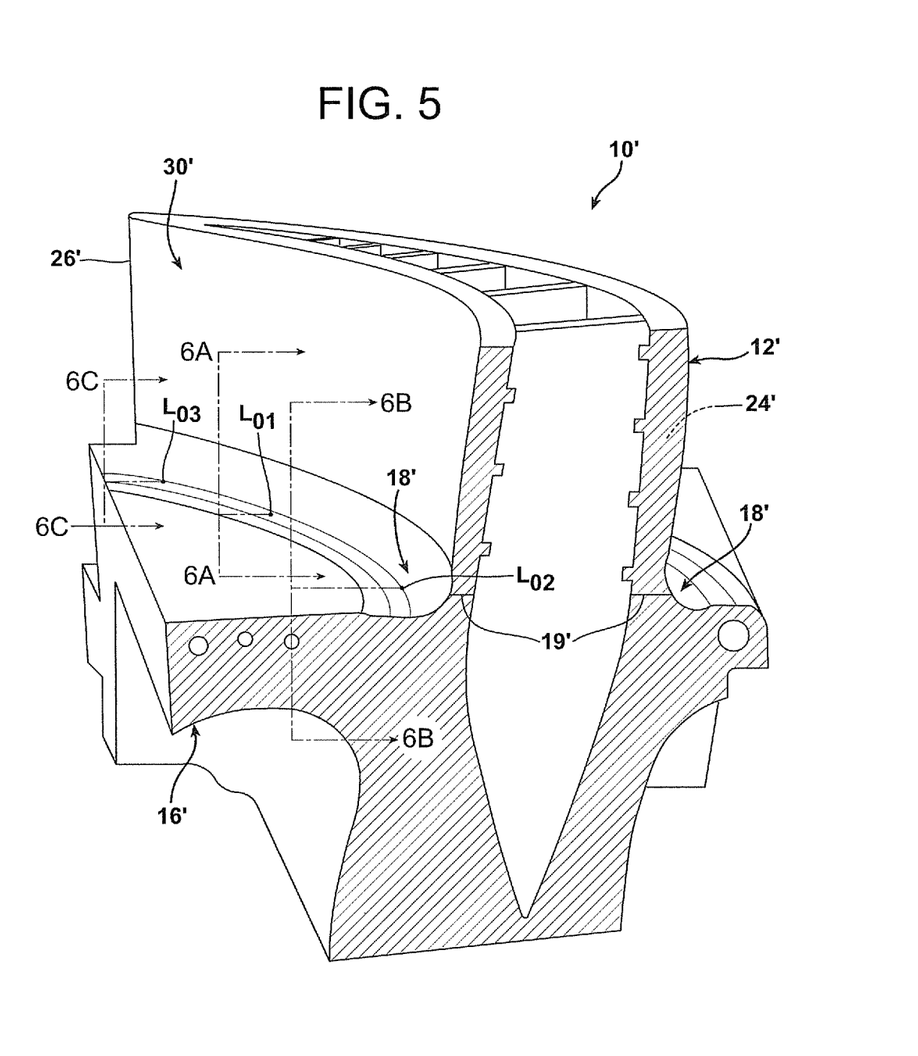
FIG. 5 is an enlarged perspective view, partially in section, illustrating a portion of an airfoil assembly to be serviced according to another embodiment of the invention.

While the depth D of the base material 30 that is removed proximate to the intersection 19 according to the method 50 described above may be generally constant from the leading edge 24 to the trailing edge 26 of the airfoil 12, the depth D of the base material 30 that is removed proximate to the intersection 19 may vary between the leading and trailing edges 24 and 26 of the airfoil 12. For example, referring to FIG. 5, a fillet area 18' of an airfoil assembly 10' according to another aspect of the invention is shown, wherein structure similar to that described above with reference to FIGS. 1-4 includes the same reference number followed by a prime (') symbol.

Figure 6A:
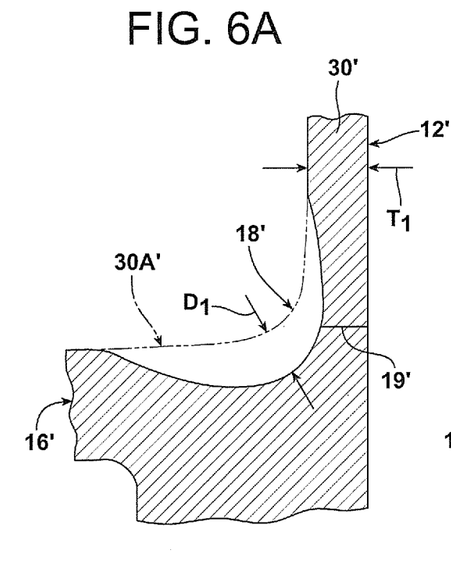
FIGS. 6A-6C are cross sectional views taken along lines 6A-6C in FIG. 5.
Figure 6B:
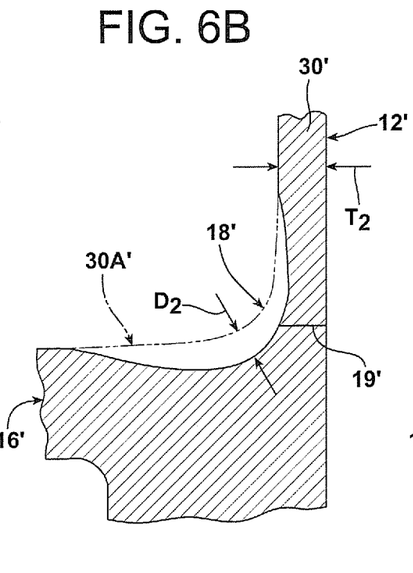
Figure 6C:
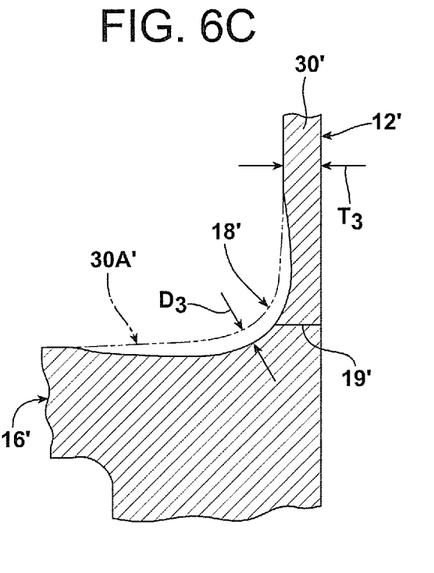

According to this aspect of the invention, a depth $D_1$ (see FIG. 6A) of the base material 30' removed proximate to the intersection 19' at a location $L_{O1}$ generally midway between the leading edge and trailing edges 24' and 26' of the airfoil 12' may comprise a first value, which may be, for example, about 0.060 inch. A depth $D_2$ (see FIG. 6B) of the base material 30' removed proximate to the intersection 19' at a location $L_{O2}$ near the leading edge 24' of the airfoil 12' may comprise a second value less than the first value, for example, about 0.030 inch. A depth $D_3$ (see FIG. 6C) of the base material 30' removed proximate to the intersection 19' at a location $L_{O3}$ near the trailing edge 26' of the airfoil 12' may comprise a third value less than the second value, for example, about 0.015 inch. It is noted that the first, second, and third values are presented herein as exemplary values and could vary depending on the configuration of the airfoil assembly 10'.

According to this aspect of the invention, the amount of base material 30' removed can be varied from the leading edge 24' of the trailing edge 26' of the airfoil 12'. This may be advantageous with airfoil assemblies 10' whose base material thickness $T_1$ is greater at the location $L_{O1}$ than the thicknesses $T_2$ and $T_3$ of the base material 30' at the respective locations $L_{O2}$ and $L_{O3}$, as may be the case with some existing airfoil assemblies 10. Hence, the structural rigidity of the airfoil assembly 10' is maintained after the removal of a portion 30A' of the base material 30 proximate to the fillet area 18'.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. A method of servicing an airfoil assembly for use in a gas turbine engine, the airfoil assembly defined by a base material and comprising an airfoil having a radially inner end which is attached to a platform from which the airfoil extends, the method comprising:

removing predetermined amounts of the base material from the airfoil assembly proximate to a fillet area and the radially inner end of the airfoil assembly at leading and trailing edges of the airfoil and at a location between the leading and trailing edges via water jet material removal, the fillet area comprising a junction between the airfoil and the platform and located at an intersection between the airfoil and the platform;

wherein a remainder of the base material comprising base material of the airfoil assembly other than proximate to the fillet area is left intact;

wherein a radius of curvature at the fillet area of the resulting structure after said removing is at least as large as a radius of curvature at the fillet area before said removing; and wherein the predetermined amounts of the base material that are removed from the airfoil assembly at the leading and trailing edges of the airfoil and at the location between the leading and trailing edges of the airfoil are dependent upon a thickness of the fillet area at these locations so as to remove the predetermined amounts of the base material including any defects in the base material at these locations such that, after the base material is removed, a structural rigidity of the airfoil is maintained at the fillet area.

2. The method of claim 1, further comprising stripping at least one coating from the airfoil assembly prior to said removing.

3. The method of claim 1, wherein said removing comprises:
removing a first portion of the base material from the airfoil; and
removing a second portion of the base material from the platform.

4. The method of claim 3, wherein said removing a first portion of the base material from the airfoil comprises removing base material starting from a location about 1 inch radially outwardly from the intersection between the airfoil and the platform.

5. The method of claim 4, wherein said removing a second portion of the base material from the platform comprises removing base material to a location about 1 inch removed from the intersection between the airfoil and the platform along a length of the platform.

6. The method of claim 1, wherein said removing comprises removing an amount of material corresponding to a depth of the base material at the fillet area measured from an outer surface of the base material of from about 0.030 inch to about 0.080 inch.

7. The method of claim 1, wherein said removing comprises removing an amount of material corresponding to a depth of the base material at the fillet area measured from an outer surface of the base material of about 0.060 inch.

8. The method of claim 1, wherein said removing comprises varying the amount of the base material that is removed from the leading edge to the trailing edge of the airfoil.

9. The method of claim 8, wherein the amount of the base material that is removed proximate to the leading and trailing edges of the airfoil is less than the amount of the base material that is removed at the location between the leading and trailing edges of the airfoil.

10. The method of claim 8, wherein the amount of the base material that is removed proximate to the leading edge of the airfoil is more than the amount of the base material that is removed at the trailing edge of the airfoil.

11. A method of servicing an airfoil assembly for use in a gas turbine engine, the airfoil assembly defined by a base material and comprising an airfoil having a radially inner end which is attached to a platform from which the airfoil extends, the method comprising:

removing predetermined amounts of the base material from the airfoil assembly proximate to a fillet area and the radially inner end of the airfoil assembly at leading and trailing edges of the airfoil and at a location generally midway between the leading and trailing edges via water jet material removal, the fillet area comprising a junction between the airfoil and the platform and located at an intersection between the airfoil and the platform;

wherein a remainder of the base material comprising base material of the airfoil assembly other than proximate to the fillet area is left intact;

wherein said removing comprises varying the amount of the base material that is removed from the leading edge to the trailing edge of the airfoil; and wherein the predetermined amounts of the base material that are removed from the airfoil assembly at the leading and trailing edges of the airfoil and at the location generally midway between the leading and trailing edges of the airfoil are dependent upon a thickness of the fillet area at these locations so as to remove the predetermined amounts of the base material including any defects in the base material at these locations such that, after the base material is removed, a structural rigidity of the airfoil is maintained at the fillet area.

12. The method of claim 11, wherein said removing comprises:
removing a first portion of the base material from the airfoil; and
removing a second portion of the base material from the platform.

13. The method of claim 12, wherein:
said removing a first portion of the base material from the airfoil comprises removing base material starting from a location about 1 inch radially outwardly from the intersection between the airfoil and the platform; and
said removing a second portion of the base material from the platform comprises removing base material to a location about 1 inch removed from the intersection between the airfoil and the platform along a length of the platform.

14. The method of claim 11, wherein said removing comprises removing an amount of material corresponding to a depth of the base material at the fillet area measured from an outer surface of the base material of from about 0.030 inch to about 0.080 inch.

15. The method of claim 11, wherein the amount of the base material that is removed proximate to the leading and trailing edges of the airfoil is less than the amount of the base material that is removed at the location generally midway between the leading and trailing edges of the airfoil.

16. The method of claim 15, wherein the amount of the base material that is removed proximate to the leading edge of the airfoil is more than the amount of the base material that is removed at the trailing edge of the airfoil.

17. The method of claim 11, wherein a radius of curvature at the fillet area of the resulting structure after said removing is at least about 0.26 inch.

18. The method of claim 17, wherein the radius of curvature at the fillet area of the resulting structure after said removing is substantially the same as a radius of curvature at the fillet area before said removing.

19. The method of claim 16, wherein:
the amount of the base material that is removed proximate to the leading edge of the airfoil is about half of the amount of base material that is removed at the location generally midway between the leading and trailing edges of the airfoil; and the amount of the base material that is removed proximate to the trailing edge of the airfoil is about half of the amount of base material that is removed proximate to the leading edge of the airfoil.

\* \* \* \* \*